United States Patent
Fehnle et al.

(10) Patent No.: US 9,551,253 B2
(45) Date of Patent: Jan. 24, 2017

(54) METHOD AND DEVICE FOR COATING A SERIES OF SUPPORT BODIES

(75) Inventors: Oliver Fehnle, Rheinfelden (DE);
Dieter Detterbeck, Altenhasslau (DE);
Axel Wienand, Oberburg (DE); Bernd Mergner, Rheinfelden (DE)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 1238 days.

(21) Appl. No.: 11/665,591

(22) PCT Filed: Oct. 14, 2005

(86) PCT No.: PCT/EP2005/011051
§ 371 (c)(1),
(2), (4) Date: Dec. 8, 2008

(87) PCT Pub. No.: WO2006/042699
PCT Pub. Date: Apr. 27, 2006

(65) Prior Publication Data
US 2009/0130294 A1 May 21, 2009

(30) Foreign Application Priority Data
Oct. 19, 2004 (DE) .................. 10 2004 051 099

(51) Int. Cl.
*B05D 1/36* (2006.01)
*F01N 3/28* (2006.01)
(Continued)

(52) U.S. Cl.
CPC .......... *F01N 3/2803* (2013.01); *B01J 37/0215* (2013.01); *B01J 35/04* (2013.01);
(Continued)

(58) Field of Classification Search
CPC ...... F01N 3/2803; B01J 35/04; B01J 37/0215; C04B 2111/081
(Continued)

(56) References Cited

U.S. PATENT DOCUMENTS 3,959,520 A * 5/1976 Hoyer et al. ............... 427/8
4,066,801 A * 1/1978 Hoyer et al. ............... 427/8
(Continued)

FOREIGN PATENT DOCUMENTS

| CN | 1233533 | 11/1999 |
|----|---------|---------|
| DE | 40 40 150 | 8/1991 |

(Continued)

OTHER PUBLICATIONS

International Search Report (PCT/EP2005/011051).
(Continued)

*Primary Examiner* — Alexander Weddle
(74) *Attorney, Agent, or Firm* — Smith, Gambrell & Russell, LLP

(57) ABSTRACT

The accuracy of the coating concentration when applying a catalytically active coating to suitable carrier bodies can be increased if, following raw coating with a relatively wide fluctuation range in the coating concentration, excessive or insufficient coating applied is if appropriate corrected iteratively. Excessive coating suspension applied is removed, for example by subsequent suction, while the coating is still in the wet state, whereas insufficient coating suspension applied is topped up, for example by spraying on additional coating suspension.

9 Claims, 2 Drawing Sheets

(51) Int. Cl.
*B01J 37/02* (2006.01)
*B01J 35/04* (2006.01)
*B05D 3/04* (2006.01)
*B05D 7/22* (2006.01)
*F01N 13/18* (2010.01)

(52) U.S. Cl.
CPC .............. *B05D 3/0493* (2013.01); *B05D 7/22* (2013.01); *F01N 13/18* (2013.01); *F01N 2510/06* (2013.01)

(58) Field of Classification Search
USPC ....... 118/107, 300, 308, 320, 321, 407, 408, 118/409, 410, 413, 416; 239/49, 548, 550, 239/551; 264/629, 630, 631, 637; 427/230, 231, 232, 235, 238, 350, 356, 427/421.1, 424, 425, 427, 427.3, 403, 427/404, 405, 409, 419.1, 419.2, 419.3; 502/527.19, 439
See application file for complete search history.

(56) References Cited

U.S. PATENT DOCUMENTS

| | | | |
|---|---|---|---|
| 4,208,454 A | 6/1980 | Reed et al. | |
| 5,165,970 A | 11/1992 | Schmidt et al. | |
| 6,149,973 A | 11/2000 | Foerster et al. | |
| 6,487,869 B1 * | 12/2002 | Sulc et al. | 62/230 |
| 6,534,113 B1 | 3/2003 | Ueberschar et al. | |
| 6,548,105 B2 | 4/2003 | Kiessling et al. | |
| 6,594,542 B1 * | 7/2003 | Williams | 700/164 |
| 6,746,716 B2 | 6/2004 | Kiessling et al. | |
| 2001/0024686 A1 | 9/2001 | Kiessling et al. | |
| 2003/0044520 A1 * | 3/2003 | Kiessling et al. | 427/79 |
| 2008/0118628 A1 * | 5/2008 | Harris et al. | 427/8 |

FOREIGN PATENT DOCUMENTS

| | | |
|---|---|---|
| DE | 198 22 505 | 11/1999 |
| EP | 0 941 763 | 9/1999 |
| EP | 1 136 462 | 9/2001 |
| EP | 1 136 462 A | 9/2001 |
| EP | 1 273 344 A | 1/2003 |
| EP | 1273344 A1 * | 1/2003 |
| EP | 1 319 436 A | 6/2003 |
| EP | 1 486 248 A | 12/2004 |
| EP | 1 570 892 A | 9/2005 |
| JP | H06-122576 | 5/1994 |
| JP | 2000-202342 | 7/2000 |
| WO | WO 2004/052501 | 6/2004 |
| WO | WO 2004/091786 A | 10/2004 |
| WO | WO 2004091786 A1 * | 10/2004 |

OTHER PUBLICATIONS

Written Opinion (PCT/EP2005/011051).
Kolb, et al.: "The Ins and Outs of Coating Monolithic Structures"; Chemical Engineering Progress; vol. 89 Feb. 1993; No. 2; pp. 61-67.

* cited by examiner

METHOD AND DEVICE FOR COATING A SERIES OF SUPPORT BODIES

FIELD OF THE INVENTION

The invention relates to a method for coating a series of carrier bodies with a coating suspension. In particular, the invention relates to a method and an apparatus for coating carrier bodies for catalysts, for example automotive exhaust gas catalysts.

BACKGROUND OF THE INVENTION

The carrier bodies for automotive exhaust gas catalysts are generally cylindrical in form, with two end faces and a shell, and have a multiplicity of flow passages for the exhaust gases from the internal combustion engines passing through them from the first end face to the second end face, substantially parallel to the cylinder axis. These carrier bodies are also referred to as honeycomb carriers.

The cross-sectional shape of the carrier bodies depends on the installation requirements at the motor vehicle. Carrier bodies with a round, elliptical or triangular cross section are in widespread use. The flow passages are generally square in cross section and are arranged in a dense grid over the entire cross section of the carrier bodies. The passage or cell density of the flow passages varies between 10 and 140 $cm^{-2}$ depending on the particular application. Honeycomb carriers with cell densities of up to 250 $cm^{-2}$ and more are in development.

Catalyst carrier bodies obtained by extrusion of ceramic compounds are predominantly used for the purification of automobile exhaust gases. Alternatively, catalyst carrier bodies made from corrugated and wound metal foils are also available. At present, ceramic carrier bodies with cell densities of 62 $cm^{-2}$ are predominantly used for purifying the exhaust gas from passenger cars. The cross-sectional dimensions of the flow passages in this case are $1.27 \times 1.27$ $mm^2$. The wall thicknesses of carrier bodies of this type are between 0.1 and 0.2 mm.

Finely distributed platinum group metals, the catalytic action of which can be modified by compounds of base metals, are generally used to convert the pollutants contained in automobile exhaust gases, such as carbon monoxide, hydrocarbons and nitrogen oxides, into harmless compounds. These catalytically active components have to be deposited on the carrier bodies. However, it is not possible to obtain the extremely fine distribution of the catalytically active components needed by depositing these components on the geometric surfaces of the carrier bodies. This applies equally to nonporous metallic carrier bodies and to porous ceramic carrier bodies. A sufficiently large surface area for the catalytically active components can only be provided by applying a support layer of fine-particle materials with a high surface area to the inner surfaces of the flow passages. This operation is referred to below as coating the carrier body. It is undesirable to coat the shell surface of the carrier bodies, and this should be avoided in order to avoid losses of valuable catalytically active materials.

For coating the carrier bodies with the fine-particle, high surface area materials a suspension of these materials in a liquid phase, generally water, is used. Typical coating suspensions for catalytic applications contain, for example, active aluminium oxides, aluminium silicates, zeolites, silicon dioxide, titanium oxide, zirconium oxide and oxygen-storing components based on cerium oxide, as support materials with a high surface area for the catalytically active components. These materials form the solids fraction of the coating suspension. Furthermore, it is possible to add to the coating suspension soluble precursors of promoters or catalytically active precious metals from the platinum group of the periodic system of the elements. The solids concentration of typical coating suspensions is in the range between 20 and 65% by weight, based on the total weight of the suspension. Their densities are between 1.1 and 1.8 kg/l.

The prior art has disclosed various methods for depositing the support layer on the carrier bodies using the coating suspension. By way of example, the carrier bodies to be coated can be immersed into the coating suspension, or the coating suspension can be poured over them. Furthermore, it is possible to pump or suck the coating suspension into the flow passages of the carrier bodies.

In all cases, excess coating material has to be removed from the carrier bodies, for example by sucking it out or blowing compressed air through the passages in the carrier bodies. This also opens up any passages which have become blocked by coating suspension.

After the coating operation, the carrier body and support layer are dried, and then the support layer is calcined on the carrier body in order to be consolidated and fixed. Then, the catalytically active components are introduced into the coating by impregnation with generally aqueous solutions of precursor compounds of the catalytically active components. Alternatively, it is also possible for the catalytically active components to be added to the coating suspension itself. In this case, there is no need to subsequently impregnate the completed support layer with the catalytically active components.

One important criterion for the coating methods is the coating or loading concentration which they can achieve in one run. This is to be understood as meaning the solids content which remains behind on the carrier body after drying and calcining. The coating concentration is given in grams per litre of volume of the carrier bodies (g/l). In practice, automobile exhaust gas catalysts require coating concentrations of up to 300 g/l. If this quantity cannot be applied in one run with the selected coating method, the coating operation has to be repeated, after drying and if appropriate calcining of the carrier body, until the desired loading has been reached. Often, two or more coating operations with coating suspensions of different compositions are carried out. This results in catalysts which have a plurality of layers with different catalytic functions on top of one another.

DE 40 40 150 C2 describes a method allowing catalyst carrier bodies in honeycomb form to be coated with a support layer or a catalytically active layer uniformly over their entire length. In the following, catalyst carrier bodies in honeycomb form are also referred to as honeycomb carriers. According to the method described in DE 40 40 150 C2, the cylinder axis of the honeycomb carrier is oriented vertically in order to be coated. Then, the coating suspension is pumped into the passages through the lower end face of the honeycomb carrier until it emerges at the upper end face. Next, the coating suspension is pumped out again at the bottom, and excess coating suspension is removed from the carrier body by blowing or sucking, in order to prevent the passages from becoming blocked. This method produces support layers which have a good uniformity over the entire length of the honeycomb bodies.

The coating method described, like any technical process, has a certain fluctuation range for the coating quantity from carrier body to carrier body. The fluctuation range depends on the nature of the coating suspension and on the properties of the honeycomb carriers to be coated.

The fluctuation range of the coating process has a direct influence on the catalytic activity of the finished catalyst, since the catalytic activity is directly dependent, inter alia, on the loading quantity of the catalytically active precious metals. Therefore, to guarantee a minimum activity of the catalysts, it is necessary to ensure that all the catalysts contain at least a target quantity of coating suspension. This means that the carrier bodies, in production, have to be overloaded with coating suspension by half the fluctuation range of the coating process. Therefore, if it is possible to reduce the fluctuation range of the coating process, the degree of overloading required can be lowered accordingly, with consequent savings on expensive precious metals and coating raw materials.

SUMMARY OF THE INVENTION

Therefore, it is an object of the present invention to provide a method and an apparatus for coating carrier bodies, in particular for catalysts, which makes it possible to coat catalyst carrier bodies with a reduced fluctuation range for the coating quantity compared to similar methods of the prior art.

This object is achieved by the features of the claims.

Before giving a more detailed description of the invention, a few terms need to be explained at this point.

In the context of the present invention, the term "body" is to be understood as meaning inert carrier bodies for catalytically active coatings. These are generally what are known as honeycomb carriers made from ceramic or metal.

In the text which follows, the term "wet uptake", or "wet coating quantity" or "raw coating", is to be understood as meaning the quantity of the coating suspension which remains on the carrier bodies after coating and before any drying operation. This can be determined by weighing the carrier body before and after coating.

By contrast, "dry uptake" is the quantity of coating material which is present on the carrier bodies after drying and calcining.

In the text which follows, the term "target quantity" is to be understood as meaning the wet uptake which is imperative to achieve the required catalytic activity and must not be undershot by any coated carrier body.

The term "finished coating" is to be understood as meaning the wet uptake which is present after the coating method has been completed.

The method according to the invention can be used to coat a series of cylindrical, open-pored bodies with at least one coating suspension, which contains solid and dissolved substances in a liquid medium, with a wet coating quantity which corresponds at least to a target coating quantity. The method is characterized by the following method steps:
a) producing a raw coating by coating the bodies with the coating suspension,
b) determining the actual quantity of raw coating applied to the bodies, and
c) correcting the actual quantity by removing coating suspension that is still wet or applying additional coating suspension, so that the coating quantity of the finished coating is within a tolerance range above the target quantity, the extent of which tolerance range is less than the fluctuation range of the raw coating.

The method is suitable for coating carrier bodies made from metal or ceramic. The carrier bodies may be in the form of what are known as honeycomb carriers with parallel flow passages open on both sides, or may comprise an open-pored or open-cell foam or fibre structure. However, the method can also be used to coat what are known as wall-flow filters, the flow passages of which are plugged on alternate sides, so that the exhaust gas is forced to flow through the porous partition walls between the flow passages on its way through the filter.

BRIEF DESCRIPTION OF THE FIGURES

Preferred embodiments of the apparatus and method are explained in more detail, by way of example, with reference to FIGS. 1 and 2, in which.

DETAILED DESCRIPTION OF THE PREFERRED EMBODIMENTS

Figure 1:
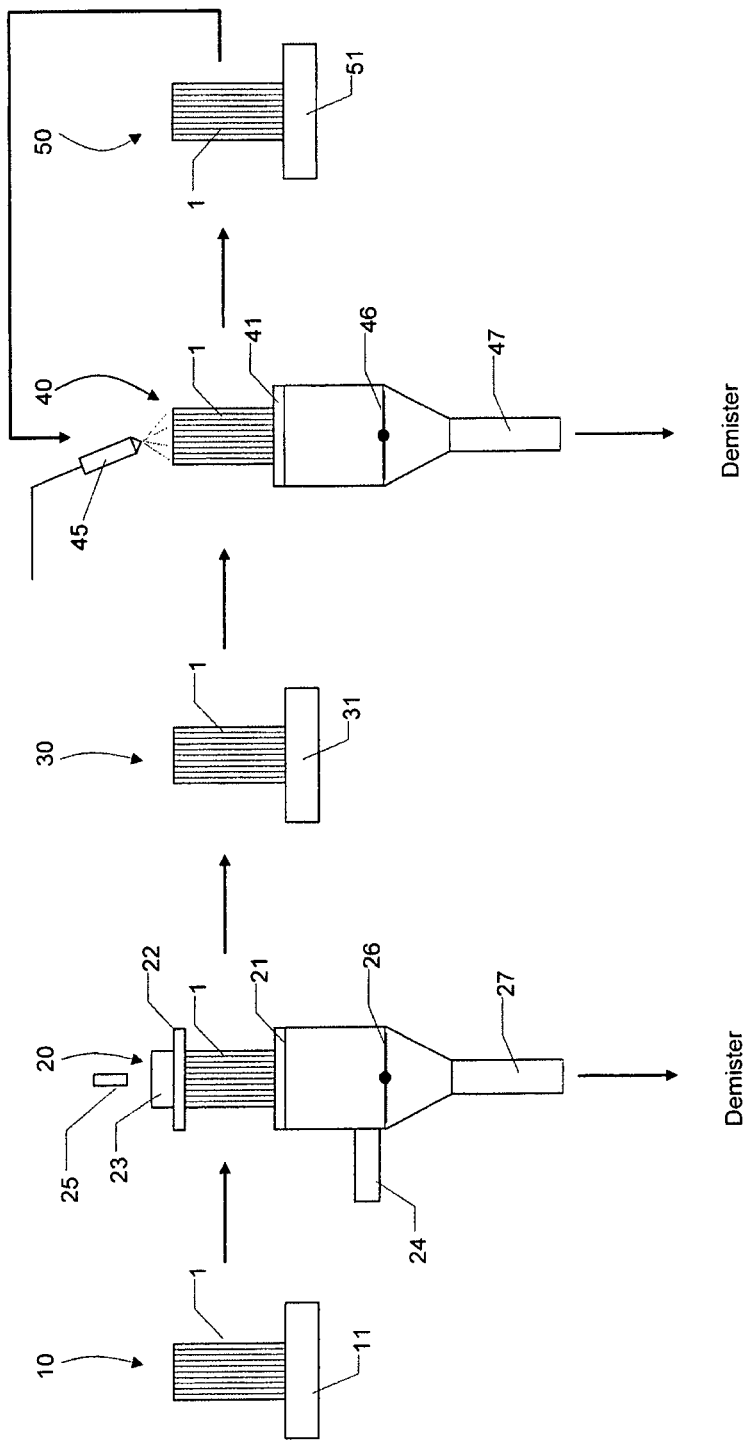
FIG. 1: shows an out line view of a preferred coating system for carrying out the method.

The following explanation of the invention assumes that carrier bodies with parallel flow passages have to be coated, such as are used in large numbers as carrier bodies for catalysts for purifying the exhaust gases from internal combustion engines.

The coating of the carrier bodies in step a) is preferably carried out in what is known as a coating station. Numerous examples of such coating stations are known from the prior art. The following explanation assumes a coating station as described, for example, in DE 40 40 150 A1, EP 0941763 A1, EP 1136462 A1 and EP 1273344 A1.

To be coated in a station of this type, the carrier bodies are oriented with their cylinder axis running vertically and their lower end face, for example, is placed onto the coating station, after which they are filled with the coating suspension from below by means of a pump or from a pressurized reservoir. Then, excess coating suspension is removed from the carrier bodies. This can be done by pumping, sucking, blowing or a combination of these actions. The carrier bodies then have a coating comprising the coating suspension on their inner wall surfaces.

The coating produced in this way on the carrier bodies is referred to below as the raw coating. The coating quantity of the raw coating depends on the solids concentration of the coating suspension, its viscosity and the coating conditions, in particular the conditions when removing excess coating suspension from the flow passages of the carrier bodies. The person skilled in the art is aware of these relationships, and he can therefore set the mean value of the actual coating quantity to a desired value taking account of the fluctuation range of this coating process.

The fluctuation range of this conventional coating process depends on the nature of the coating suspension and other parameters of the coating process. The fluctuation range is usually from ±5% to ±10%. In advantageous cases, it can be reduced to ±2%.

To narrow the fluctuation range of this conventional coating process, the invention provides for the coating quantity applied to be corrected. For this purpose, in step b) the actual quantity of the coating is determined. If the actual quantity of the raw coating is below the target quantity, according to the invention additional coating suspension is applied to the carrier body. On the other hand, if the actual quantity of the raw coating is above the defined tolerance range for the finished coating, some of the coating suspension, which is still wet, is removed from the carrier body. In both cases, the aim is to shift the actual quantity of the coating into the stipulated tolerance range for the finished coating above the target quantity by means of a single correction.

After the coating quantity has been corrected, the new actual quantity can be determined again, and if appropriate a further correction in accordance with step c) can be carried out. Method step b) (determination of the actual quantity) and method step c) (correction of the actual quantity) can therefore be run through a number times iteratively until the required accuracy of the coating quantity is reached. In the text which follows, the sequence of running through method steps b) and c) is referred to as an iteration loop.

The iteration process and therefore the coating process is terminated when the actual quantity of the coating is within the stipulated tolerance range for the finished coating.

To improve the uniformity of the coating on the carrier body in the axial direction, the carrier body can be rotated through 180° about a horizontal axis between two iteration loops, so that in the following iteration loop the end face of the carrier body which was previously at the bottom is then at the top.

The mean value of the wet coating quantity in step a) relative to the desired target quantity is of subordinate importance to the method. It may be either below or above the target quantity or may be equal to the target quantity. In particular, in step c) there may be a change between negative and positive differences between actual quantity and target quantity on the same carrier body if the correction overshoots its target. Therefore, the removal of coating suspension that is still wet if the actual quantity is greater than the target quantity may alternate with the application of additional coating suspension if the actual quantity is lower than the target quantity.

However, it is particularly advantageous to ensure that the actual coating quantity, taking account of the fluctuation range of the coating process in step a), is always below or above the target quantity. It has been found that in the former case the process can be carried out in such a way that to move closer to the target quantity it is in each case only necessary to apply additional coating suspension, and in the latter case it is only necessary to remove coating suspension in the iteration loops. It is then possible to substantially rule out the need to change between the application of additional coating suspension and the removal of coating suspension. The first method variant is particularly preferred in this context, i.e. that of setting the coating quantity in step a) such that the coating quantity applied in step a) is below the required target quantity for all the carrier bodies.

To determine the actual coating quantity in step a), the carrier body is preferably weighed before and after the coating operation. After the coating quantity has been corrected in step c), the carrier body is weighed again in order to determine the new actual quantity by comparing it with the weight prior to coating in step a) and thereby assessing the success of the correction and if appropriate initiating a further iteration loop.

If there is a negative difference between actual quantity and target quantity, the additional coating suspension can be applied to the upper end face of the vertically oriented carrier body. Then, this additional coating suspension can be distributed over the length of the carrier body by being sucked or blown through it.

If there is a positive difference between actual and set coating quantity, the actual quantity can be brought closer to the required set coating quantity by sucking or blowing out coating suspension. The intensity and/or duration of the sucking or blowing are in this case selected as a function of the quantity difference determined. By way of example, the matching of intensity and/or duration of the sucking or blowing can consist in selecting the corresponding values from tables of values for the measured actual quantity, determined in preliminary tests. Alternatively, intensity and/or duration can be controlled as a function of the values for actual quantity, intensity and/or duration, and the resulting reduction in the difference between actual quantity and target quantity, determined for the bodies coated immediately beforehand, i.e. the sucking or blowing in step c) is predictively set, on the basis of the starting weight or deviation from the required target quantity, in such a way that the actual quantity moves as close as possible to the target weight or set coating quantity in the carrier body.

According to the invention, therefore, a conventional coating method is used to apply a raw coating to the carrier body. This is followed by a correction in which any excess or insufficient coating suspension (based on a target value or the target quantity) is sucked out or applied.

After the coating process has been completed, the coated carrier bodies are dried at an elevated temperature of between 80 and 200° C. for a period of 5 minutes to 2 hours and then calcined, usually at temperatures of between 300 and 600° C., for a duration of 10 minutes to 5 hours. The calcining is responsible for securely fixing the coating on the carrier body and converts any precursor compounds in the coating suspension into their final form.

The proposed method gives an excellent accuracy, i.e. a low fluctuation range, of the coating concentration from body to body when coating carrier bodies with catalytically active coatings. The increased accuracy is obtained by the correction according to the invention in step c).

It is particularly advantageous to apply the method for producing multiple layers on the carrier bodies. In this case, the fluctuation ranges of the individual coatings are cumulative, which means that in conventional methods the finished multiple coating is likely to be subject to considerable fluctuation ranges. The application of the method according to the invention to this coating problem makes it possible to produce multiple layers with greatly reduced fluctuation ranges in the coating concentration.

Figure 2:
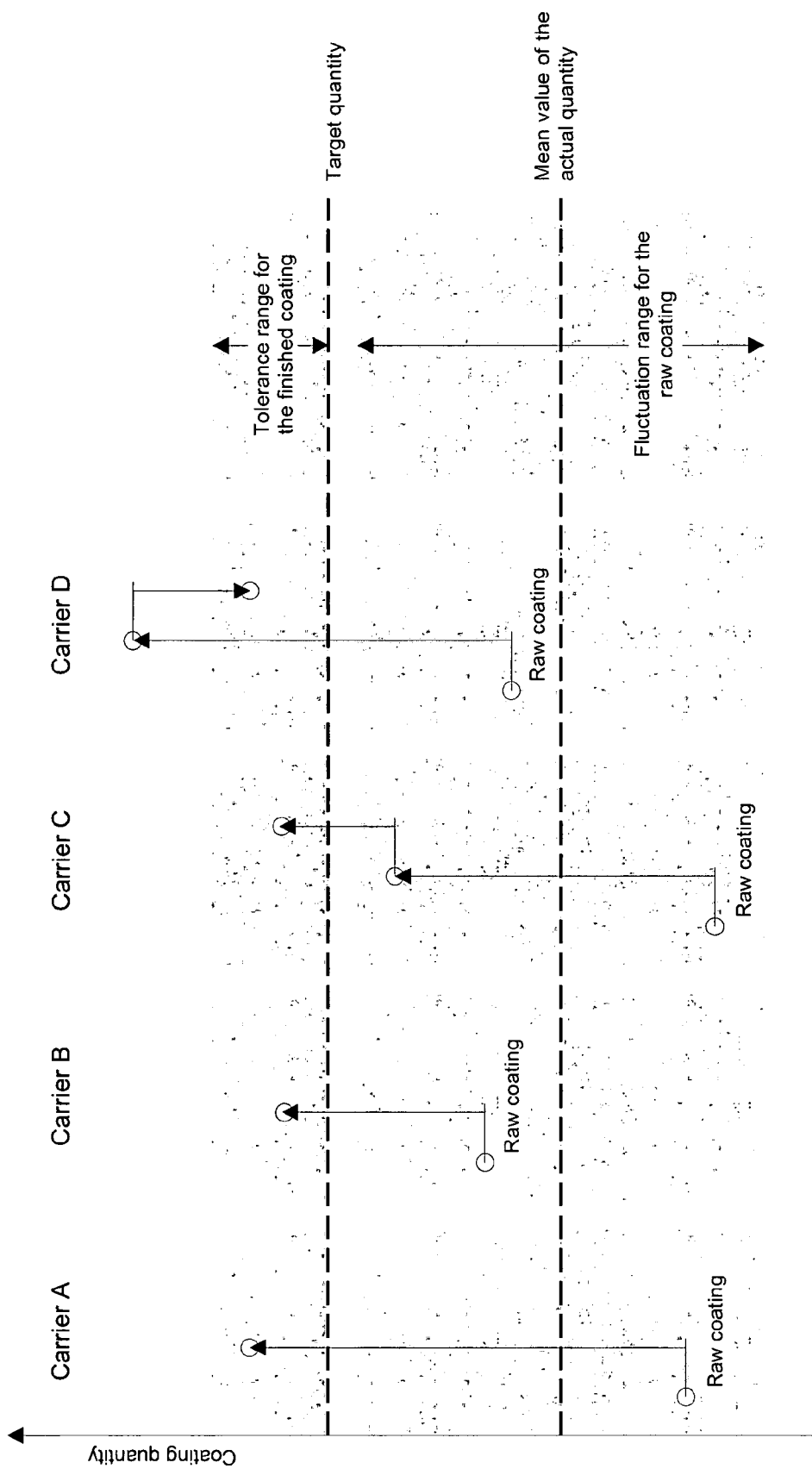
FIG. 2: diagrammatically depicts the coating method.

Preferred embodiments of the apparatus and method are explained in more detail, by way of example, with reference to FIGS. 1 and 2, in which:

FIG. 1: shows an outline view of a preferred coating system for carrying out the method, and FIG. 2: diagrammatically depicts the coating method.

FIG. 1 shows the possible structure of a coating system that is suitable for the method. The coating system preferably includes a coating station 20 for producing the raw coating. For this purpose, the carrier body 1 that is to be coated is placed on the holding elements provided for this purpose, cf. FIG. 1. The carrier body 1 is fixed on the station and sealed by inflating an inflatable rubber cuff 21. Furthermore, there can be a second sealing cuff 22, which is fitted to the upper end of the carrier body 1 in order to tightly fix an overflow 23. It is preferable for a level sensor 25, which detects sufficient filling of the carrier body 1 and accordingly transmits a signal to the apparatus control unit of the coating system, to be arranged above.

To produce the raw coating, the coating suspension is pumped into the carrier body from below via the feed line 24 until the level sensor indicates that a defined level has been reached. Then, excess coating suspension is removed from the passages of the carrier body by opening a suction or throttle valve 26. For this purpose, a pump line 27 is connected to a reduced-pressure vessel (not shown here) and a demister. The reduced-pressure vessel is connected to a fan which maintains a subatmospheric pressure of between preferably 50 and 500, particularly preferably 300 mbar. The intensity and duration of the suction can be set with the aid of the throttle valve 26. These parameters determine the raw coating quantity which remains on the carrier body. This operation also serves to open up any passages which may have become blocked by coating suspension.

FIG. 1 also shows a weighing station 30, in which the coated carrier body 1 is weighed on a balance 31. It is in this way possible to determine the quantity of coating suspension in the carrier body 1. In addition, it is possible to provide a weighing station 10 with balance 11 upstream of the coating station 20, in order to determine the weight of the carrier body 1 prior to coating.

If it is found in the weighing station 30 that the loading of the carrier body 1 with coating suspension is outside the tolerance range for the finished coating, the carrier body is passed to a correction station 40. In the correction station, it is possible both to remove excess coating suspension applied by suction via the suction line 46 and to top up an insufficient application of coating suspension via the spray nozzle 45.

In the correction station 40, as in the coating station 20, there is a sealing cuff 41, which fixes the carrier body 1 tightly to the correction station 40. The quantity of coating suspension sucked out can be controlled or regulated via a suction valve 46. On the other hand, should the weighing station 30 determine that the coating quantity applied is already within the tolerance range for the finished coating, the carrier body is discharged from the coating system without any correction to the coating quantity and is then fed to a drying and calcining station (not shown here).

After the correction operation, it is particularly preferable for the carrier body 1 to be weighed again in the weighing station 30 or in a further weighing station 50 with a balance 51, as illustrated in FIG. 1. Should the further check of the quantity of coating suspension on the carrier body 1 establish that the actual coating quantity is still outside the tolerance range for the finished coating, the carrier body can be passed into the correction station 40 once again. Otherwise, the carrier body is discharged from the coating system and fed to the drying and calcining station.

As has already been indicated, the weighing stations 30 and 50 may be combined, depending on the desired flexibility and/or speed of the system as a whole. Furthermore, the weighing stations 30 and/or 50 may be combined with the suction station 50 or the coating station 20.

FIG. 2 diagrammatically depicts the operations involved in coating four carrier bodies A, B, C and D in accordance with the invention.

The coating quantity required to achieve a minimum catalytic activity is referred to as the "target quantity" in FIG. 2. After the coating method has ended, none of the coated carrier bodies should have a coating quantity below the target quantity. Therefore, the permissible tolerance range for the finished coating is directly above the target quantity.

It is assumed in FIG. 2 that the coating method has been set in such a way that the mean value of the actual coating quantities which can thereby be achieved is below the set coating quantity, specifically at a distance greater than half the fluctuation range of the raw coating. The raw coating quantities on carrier bodies A to D are therefore all below the target quantity. The fluctuation range for the raw coating quantity is significantly greater than the desired tolerance range for the finished coating.

According to the invention, the raw coating quantities are raised into the tolerance range for the finished coating by applying a correction. In the case of carrier bodies A and B, this is achieved by means of a single correction. In the case of carrier body C, the first correction is insufficient, on account of fluctuations in the process, to shift the coating quantity into the tolerance range for the finished coating. Therefore, a second correction is required here. In the case of carrier body D, the first correction has overshot the target. The additional coating quantity applied in the first correction step has overcompensated for the previous deficiency of coating quantity. Therefore, the second correction has to remove some coating suspension from the carrier body again.

In the illustration shown in FIG. 2, it has been assumed that the mean value for the actual quantity is below the target quantity. However, the method is also suitable in a similar way for mean values of the actual quantity which are above the target quantity or directly in the tolerance range for the finished coating.

Even though the proposed method is able to shift the coating quantity applied to a carrier body into the desired tolerance range for the set coating on an iterative basis, in a preferred embodiment of the method it is always attempted to achieve the desired target by means of a single correction of the coating quantity.

What is claimed is:

1. A method for coating a series of open-pored bodies with at least one coating suspension for producing coated bodies having a predetermined catalytic activity, comprising
   a) performing a raw coating process comprising introducing to the bodies a first quantity of the coating suspension that is greater than a target coating quantity and removing a second quantity of the coating suspension that is designed to yield on the bodies a raw coating of the coating suspension that is made to be below the target coating quantity, the target coating quantity being the minimum quantity of coating suspension that is required, in the wet state, for achieving the predetermined catalytic activity;
   b) determining the raw coating quantity produced on the bodies; and
   c) correcting the raw coating quantity by introducing a third quantity of coating suspension to the raw coating quantity while the raw coating is still wet, so that a final coating quantity is made to be equal to or greater than the target coating quantity,
   wherein the raw coating process of step a) has a predetermined fluctuation range that defines a minimum quantity of raw coating that the process is predetermined to apply to a body and a maximum quantity of raw coating that the process is predetermined to apply to a body, and
   wherein any difference between the target coating quantity and the final coating quantity applied in step c) is less than half the difference between the predetermined minimum and maximum quantities of raw coating defined by the fluctuation range of the raw coating process of step a).

2. The method according to claim 1, in which the raw coating quantity is determined by weighing the bodies before and after the coating operation in step a).

3. The method according to claim 1, in which the bodies to be coated in step a) are oriented vertically and are filled with the first quantity of coating suspension via a lower end face.

4. The method according to claim 1, in which the second quantity of coating suspension is removed from the bodies in step a) by pumping, sucking, blowing or a combination of these actions.

5. The method according to claim 1, in which the coating of the carrier bodies is dried and calcined after step c).

6. The method according to claim 1, wherein the third quantity of coating suspension is introduced via an upper end face of the carrier bodies, while the carrier bodies are vertically aligned.

7. The method according to claim 1, wherein the third quantity of coating suspension is distributed over the length of the carrier bodies by sucking or blowing.

8. A method for coating an open-pored body with at least one coating suspension for producing a coated body having a predetermined catalytic activity, comprising
   a) performing a raw coating process comprising introducing to the body a first quantity of the coating suspension that is greater than a target coating quantity and removing from the body a second quantity of the coating suspension that is designed to yield on the body a raw coating of the coating suspension that is made to be below the target coating quantity, the target coating quantity being the minimum quantity of coating suspension that is required, in the wet state, for achieving the predetermined catalytic activity;
   b) determining the quantity of raw coating produced on the body; and
   c) correcting the raw coating by introducing a third quantity of coating suspension to the raw coating while the raw coating is still wet, so that a final coating quantity is made to be equal to or greater than the target coating quantity,
   wherein the raw coating process of step a) has a predetermined fluctuation range that defines a minimum quantity of raw coating that the process is predetermined to apply to a body and a maximum quantity of raw coating that the process is predetermined to apply to a body,
   wherein any difference between the target coating quantity and the final coating quantity applied in step c) is less than half the difference between the predetermined minimum and maximum quantities of raw coating defined by the fluctuation range of the raw coating process of step a), and
   wherein, in step c) the quantity of raw coating is brought closer to the target coating quantity by introducing the third quantity of coating suspension to an upper end face of the carrier body, and then distributing the third quantity of coating suspension over the length of the carrier body by sucking or blowing.

9. A method for coating an open-pored body with at least one coating suspension for producing a coated body having a predetermined catalytic activity, comprising
   a) performing a raw coating process comprising introducing to the body a first quantity of the coating suspension that is greater than a target coating quantity and removing from the body a second quantity of the coating suspension that is designed to yield on the body a raw coating of the coating suspension that is made to be below the target coating quantity, the target coating quantity being the minimum quantity of coating suspension that is required, in the wet state, for achieving the predetermined catalytic activity;
   b) determining the quantity of raw coating produced on the body; and
   c) correcting the raw coating by introducing a third quantity of coating suspension to the raw coating while still wet, so that a final coating quantity is made to be equal to or greater than the target coating quantity,
   wherein the raw coating process of step a) has a predetermined fluctuation range that defines a minimum quantity of raw coating that the process is predetermined to apply to a body and a maximum quantity of raw coating that the process is predetermined to apply to a body,
   wherein any difference between the target coating quantity and the final coating quantity applied in step c) is less than half the difference between the predetermined minimum and maximum quantities of raw coating defined by the fluctuation range of the raw coating process of step a), and
   wherein the additional coating suspension is distributed over the entire length of the raw coating produced in step a).

* * * * *